United States Patent Office 3,479,198
Patented Nov. 18, 1969

3,479,198
TREATED VINYL AND POLYESTER AND METHODS AND COMPOSITIONS FOR THE PRODUCTION AND USE THEREOF
Julius O. Barth, Aurora, Ill., assignor to The Permalux Company, Aurora, Ill., a corporation of Illinois
No Drawing. Continuation-in-part of application Ser. No. 395,331, Sept. 9, 1964, and Ser. No. 447,075, Apr. 9, 1965. This application Sept. 14, 1967, Ser. No. 667,647
Int. Cl. B44d 1/12; C09d 3/48
U.S. Cl. 117—15                          12 Claims

ABSTRACT OF THE DISCLOSURE

Vinyl and polyester materials are provided with a surface film consisting of a vinyl chloride-acetate copolymer, said copolymer being applied in a solvent solution.

Upon drying of the film, inks and coatings of virtually any composition can be applied whereby printed vinyl and polyester can be produced. In a preferred form of the invention, acrylic polymers and alkyd-acrylic copolymers are combined with the vinyl chloride-acetate copolymers in the formation of the film.

---

This application is a continuation-in-part of applicant's copending applications Ser. No. 395,331, filed Sept. 9, 1964, now abandoned, and Ser. No. 447,075, filed Apr. 9, 1965, now abandoned.

The instant invention is directed to printed vinyl and polyester and to methods and novel compositions adapted to be utilized for printing onto the vinyl and polyester surfaces. The invention is particularly directed to systems providing for the treatment of vinyl and polyester surfaces whereby printing inks and similar materials can be efficiently applied to said surfaces.

The use of vinyl and polyester materials is well known, and the application of printing inks and similar materials onto such surfaces has become increasingly popular. Printing applications usually involve the display of written material or decorative designs on the surfaces.

Vinyl and polyester materials are employed to a large extent in the production of labels or other items where the materials are in sheet form. Containers or other three-dimensional objects are also formed of such materials and even though the invention will be described relative to vinyl and polyester materials in sheet form, it will be understood that the invention is directed to all items which have exposed vinyl or polyester surfaces.

In the production of labels or the like, sheets or rolls of material may be provided with adhesive on one surface whereby the sheets can be readily secured in place. The opposite surface of the sheets carries printed lettering or designs employed for informational and decorative purposes. Where a pressure sensitive adhesive or the like is applied during production, a protective sheet of paper is located over the adhesive side of the vinyl sheet, and this paper can be readily peeled off before application. Otherwise, adhesive or other securing means can be provided as desired.

As noted in the aforementioned copending applications, printing onto vinyl or polyester surfaces, whether oriented or non-oriented, presents certain problems. The difficulties experienced arise primarily due to the fact that inks other than vinyl and acrylic base inks will not adhere to vinyl, and all types of ink have insufficient or no adhesion with respect to polyester surfaces. This difficulty can apparently be explained by the fact that in the case of vinyl surfaces, inks other than vinyl and acrylic base inks are chemically unrelated with the surfaces. In the silk screen and graphic arts, generally the approach to ink adhesion is to develop special ink formulae to achieve adhesion to the substrate being printed. Kuhn Patent No. 2,686,736 and Goldstein Patent No. 2,872,423 illustrate this approach.

Vinyl and acrylic base inks will provide satisfactory adherence when applied to vinyl, but this does not apply to a polyester surface; however, it has been found that the chemical compositions of such inks must be maintained within relatively narrow limits, with these limits depending upon the particular type of surface involved. Production problems and inconsistent quality frequently result when such inks are employed.

Vinyl and acrylic base inks are also undesirable in many instances since these inks are characterized by low gloss, poor colors, and lack of fullness and depth. Since printed products are in many cases employed for advertising purposes, the character of the printed surfaces where vinyl and acrylic base inks are employed is considered undesirable.

It is also recognized that under current production methods and techniques, an extremely limited amount of colored vinyl film can be produced. Coloring of vinyl is accomplished by the addition of pigments or dyes to the vinyl plastic mass when it is in a molten or semi-molten state. The viscosity of this mass when it is in this semi-fluid state is extremely high. This makes uniform dispersion of pigments extremely difficult, if not impossible. Since the film is extruded into thicknesses ranging from one mil upwards, the uneven pigment dispersion results in streaks and uneven coloring and hiding. Furthermore, many pigments become reactive in the presence of even slightly elevated temperatures. For these reasons, the production of commercially acceptable colored vinyl film by current technologies is costly and impractical. Furthermore, the addition of pigments to the plastic mass results in a film of considerably reduced tensile strength.

From the commercial standpoint, there is considerable demand for a large variety of colored vinyl film but even if current techniques permitted, it would be economically impractical to build inventories of large varieties of colored film in anticipation of customer requirements.

The aforementioned copending applications are generally directed to systems involving the treatment of surfaces whereby inks and similar materials which vary widely in chemical composition can be applied to the surfaces. In particular, the prior applications disclose compositions which are adapted to be applied over vinyl and polyester surfaces as films whereby printing operations involving the application of ink on to the films can be undertaken. The compositions disclosed provide for excellent adhesion of the printing inks with respect to vinyl and polyester substrates. A wide variety of inks can be employed where the disclosed composition is first applied over the vinyl or polyester surfaces, and for that reason, vinyl, and also polyester materials can be utilized in a wide variety of applications which require special types of printing material.

Procedures described in the prior applications have been found to be completely satisfactory where coating materials of the specified compositions are applied over vinyl and polyester surfaces. The printing applied over the vinyl surfaces having the intercoat compositions thereon will adhere to a highly satisfactory degree and the normal characteristics of the printing ink, such as gloss, can be readily achieved. Furthermore, it has been found that the printed sheets display remarkable stain resistance.

As explained in Ser. No. 447,075, it is sometimes necessary to vary the intercoat compositions in order to increase production rates and to accommodate available drying facilities. Specifically, air drying will slow down operations and where forced drying is resorted to, some compositions present difficulties. It was also found that the use of acrylic or alkyd-acrylic copolymers in combination with a vinyl chloride-acetate copolymer greatly enhanced the compositions, and that certain solvent combinations also provided highly desirable results.

It is an object of this invention to provide improvements in vinyl and polyester materials through the use of intercoat compositions and methods whereby coating materials such as printing inks can be applied over vinyl and polyester surfaces to achieve ideal adherence and notably improved durability.

It is a more particular object of this invention to provide compositions of the type described which are characterized by excellent stability even when baked immediately after application whereby highly efficient operations can be undertaken.

It is a further object of this invention to provide vinyl and polyester film having the appearance of colored film whereby printing operations can be conducted on films having a variety of backgrounds.

These and other objects of this invention will appear hereinafter and it will be understood that the specific examples hereinafter set forth are provided solely for purposes of illustration and not by way of limitation.

The intercoat composition of this invention generally comprises a mixture of various chemicals which form a composition uniquely suitable for application over vinyl and polyester surfaces. As set forth in Ser. No. 395,331, the composition must include as essential ingredients a vinyl chloride-acetate copolymer in combination with a solvent. In Ser. No. 447,075, reference is made to the addition of at least one acrylic polymer or alkyd-acrylic copolymer, and a combination of ketones as the solvents. This application also referred to the inclusion of at least one modified formaldehyde resin or epoxy resin, at least one suitable stabilizer or stabilizer system, and at least one aromatic hydrocarbon.

The compositions described in Ser. No. 395,331 consist essentially of a vinyl chloride-acetate copolymer or modified vinyl chloride-acetate copolymer in combination with a solvent selected from the group consisting of ketones, nitro compounds, esters, chlorinated hydrocarbons and aromatic hydrocarbons. The film when applied preferably includes from 10 to 15 percent by weight of the vinyl chloride-acetate copolymer and the balance solvent, although up to 20 percent by weight of the copolymer may be employed, it being understood that the solvent evaporates and, therefore, the initial solvent proportion is important primarily due to application convenience.

The addition of at least one acrylic polymer or alkyd-acrylic copolymer in amounts between 7.5 and 20 percent by weight as set forth in Ser. No. 447,075 greatly contributes to the durability and permanent flexibility which is achieved in the intercoat films of the invention. It has been found that the presence of such materials in the applied film virtually eliminates any adhesion problem even when baking is utilized to speed up the drying operation and to thereby provide improvements in production efficiency.

Another addition contemplated comprises up to one percent by weight polyvinyl chloride. This ingredient can be tolerated in such minor proportions (up to about five percent by weight of the final film) and certain improvements in durability and toughness will be provided.

The use of a formaldehyde resin or an epoxy resin is preferred since it has been found that a crosslinking effect is achieved by the addition of such compounds. Without the thermosetting resins, the intercoat may be air-dried or force-dried, but baking is necessary to convert the thermosetting combination. In some cases, we obtain a physical dispersion of the crosslinking resin through the film structure. In other cases, there is a chemical reaction or condensation of the free hydroxyl groups in the vinyl chloride-acetate copolymer and the cross-linking resin.

The principal reasons for adding the thermosetting resin are to increase the solvent-resistance of the coating, to improve the surface hardness and gloss, to improve the print-resistance, to improve the adhesion, and to minimize the softening at higher temperatures.

The stabilizers or stabilizer systems employed preferably comprise stabilizers which provide heat resistance plus resistance to ultra-violet light. Available stabilizers provide distinct improvements in the intercoat composition after a baking operation, and other stabilizers also provide improvements in the life of the vinyl or polyester product by reason of their resistance to ultra-violet light. The stabilizer systems which are preferred comprise a combination of such stabilizers.

Aromatic hydrocarbons such as toluol, and xylol are employed since such materials are relatively inexpensive, and these materials provide an ideal diluent for the intercoat composition. It will be appreciated that acrylics and other compounds may be supplied in these hydrocarbons, thereby providing at least a portion of the diluent is employed in order to maintain the intercoat composition in a state such that the composition can be readily applied over the surfaces. Exuellent flow characteristics in the final product are achieved when such diluents are added in amounts such that the total solids content of the composition will not exceed 20 percent by weight. This ratio of solid to liquid represents a preferred feature of the invention although any solid content and solvent combination which provides suitable flow characteristics is contemplated.

The intercoat of film can be applied by any conventional method such as spraying, roller coating, silk screen printing, brushing with a doctor blade or by any other suitable method for coating application. Individual sheets could be coated, however, it is most advantageous to provide film in continuous rolls and to then roll up the coated film, particularly where the film is to be transported to a different location for printing.

For use as the vinyl chloride-acetate copolymer, and modified vinyl chloride-acetate copolymer, it is contemplated that a variety of formulations will be satisfactory. Typical copolymers contain about 90 percent by weight vinyl chloride and 10 percent by weight vinyl acetate with modified copolymers including additives such as vinyl alcohol and maleic acid. Specifically, Bakelite (Union Carbide) designations VMCC, VAGH, VMCH, VAGD, VYLF, VYHH, VYNS, and VYNW are highly satisfactory.

The compositions of these copolymers are as follows:

VAGH—A partially hydrolyzed vinyl chloride-vinyl acetate copolymer having a vinyl chloride content of 91%. (Described in Bakelite Vinyl Resin Product Data Booklet J–2198–C/116–4.)

VYHH—A vinyl chloride-vinyl acetate copolymer having a composition of approximately 87% vinyl chloride; 13% vinyl acetate. (Described in Bakelite Vinyl Plastics Product Data Booklet J–2195–B/026–4.)

VMCC—A modified vinyl chloride-vinyl acetate copolymer having a composition of approximately 84% vinyl chloride; 15% vinyl acetate; and 0.8% interpolymerized maleic acid. (Described in Bakelite Vinyl Resin Product Data Booklet J–2453–A/096–5.)

VMCH—A modified vinyl chloride-vinyl acetate copolymer having a composition of about 86% vinyl chloride; 13% vinyl acetate; and 1% interpolymerized dibasic acid (0.7–0.8 carboxyl). (Schildknecht entitled "Vinyl and Related Polymers" published by Wiley, 1952.)

VYLF—A vinyl chloride-vinyl acetate copolymer having a composition of approximately 87% vinyl chloride; and 13% vinyl acetate.

VAGD—A vinyl chloride-vinyl acetate copolymer having a vinyl chloride content of 91%; a vinyl acetate content of 3% and approximately 5.9% vinyl alcohol.

VYNS—A vinyl chloride-vinyl acetate resin containing approximately 90% vinyl chloride and 10% vinyl acetate having an inherent viscosity of 0.80 measured on .2 g. in cyclohexanone at 25° C.

VYNW—A vinyl chloride-vinyl acetate copolymer containing approximately 97% vinyl chloride; 3% vinyl acetate having an inherent viscosity of 1.07 measured at .2 g. in cyclohexanone at 25° C.

The following comprises a table listing several suitable solvents; however, it wil be appreciated that the list is not exclusive:

Nitro compounds: 2-nitropropane
Esters: Amylacetate, N-butyl acetate, Propyl acetate, isobutylacetate, ethylacetate methyl acetate, ethleneglycol monoethylether acetate ("Cellosolve acetate") diethyleneglycol monobutylether acetate ("butylcarbitol acetate")
Chlorinated hydrocarbons: Dichlorethylene, trichlorethylene, perchlorethylene, monochlorbenzene
Aromatic hydrocarbons: Toluene, xylene
Ketones (saturated and unsaturated): Isophorone, methyl isoamylketone, methylisobutylketone, acetone, methylethylketone, diethylketone, methyl propylketone, mesityloxide, ethyl butylketone, diacetone alcohol, tetrahydrofuran, cyclohexanone In the aforementioned applications, isophorone has been referred to as a desirable solvent. It has now been found that cyclohexanone is equally as effective and is in certain respects superior to isophorone and, accordingly, cyclohexanone represents a preferred substitute for isophorone. Similarly, ethylacetate is a highly suitable substitute for methylethyl ketone, heretofore considered to be a preferred ingredient.

The following illustrates the composition ranges for an intercoat composition where the vinyl chloride-acetate copolymer is used without alkyd or alkyd-acrylic:

TABLE I

| Ingredients: | Percent by weight |
|---|---|
| Vinyl chloride-acetate copolymer | 10–20 |
| Ketones | 80–90 |

A composition of this type is preferably prepared by mixing the ketones at room temperature and adding the copolymer to this mixture.

The following tables illustrate the ranges for the various elements where the acrylic or alkyd-acrylic polymers are employed:

TABLE II

| Ingredients: | Percent by weight |
|---|---|
| Vinyl chloride acetate copolymer | 3.0–12.0 |
| Acrylic polymers and/or alkyd-acrylic copolymer | 7.5–20.0 |
| Ethylacetate, methylethyl-ketone and/or methylisobutyl ketone | 45.0–75.0 |
| Cyclohexanone or isophorone | 1.0–5.0 |
| Modified formaldehyde resin or epoxy resin | 0.0–5.0 |
| Stabilizer | 0.0–1.0 |
| Aromatic hydrocarbons | 0.0–25.0 |

In accordance with a preferred form of the instant invention, intercoat compositions are selected from the range of compositions as set forth in the following table:

TABLE III

| Ingredients: | Percent by weight |
|---|---|
| Vinyl chloride acetate copolymers | 5.0–10.0 |
| Acrylic polymers | 6.5–11.0 |
| Alkyd-acrylic copolymers | 2.3–5.7 |
| Ethylacetate | 23.0–36.0 |
| Methylisobutylketone | 25.0–38.0 |
| Cyclohexanone | 1.0–3.9 |
| Modified formaldehyde resin or epoxy rsein | 1.5–4.2 |
| Stabilizer | 0.35–0.75 |
| Aromatic hydrocarbons | 12.0–23.5 |

Other ketones can be substituted for those listed and, with respect to Table I, it will be understood that the resins, stabilizers and aromatic hydrocarbons can be utilized therein in essentially the proportions set forth in Tables II and III.

It will be noted that the vinyl chloride acetate copolymer is included in lesser amounts when the acrylic and alkyd-acrylic is included. Thus, these latter ingredients act as substitutes for a portion of the former whereby a maximum of about 23 percent by weight of these ingredients are included in the film as applied. It is again emphasized, however, that the amount of diluent or solvent can be varied for application convenience. Based on the ranges of Table II, these ingredients are present, in the final coating, between a maximum of about 7 parts and a minimum of about 0.6 part of acrylic or alkyd-acrylic to one part of the vinyl chloride acetate copolymer.

The following disclosure sets forth typical compounds falling into the classes of compounds discussed above and suitable for use in accordance with the features of this invention. It will be understood that the particular compounds referred to herein are only considered to be illustrative of the great number of compounds which also fall within the scope of the instant invention.

In the case of acrylic polymers, Acryloid B72, B66, A11, and B44 supplied by Rohm & Haas and Lucite 2013, 2044, 6014 and 6016 supplied by du Pont are preferred. The group comprises methyl-methacrylate/ethyl-acrylate copolymer, methylmethacrylate copolymers, N-butyl methacrylate, and butyl-methacrylate copolymer. It will be appreciated from the above examples that the instant invention contemplates the use of any acrylic polymer comprising a methyl-, ethyl-, butyl- or isobutyl-variation of methacrylate and acrylate. Copolymers are preferred; however, certain homopolymers are perfectly suitable for the practice of this invention.

Of the alkyds, Duraplex ND76, ND77B, ND78 and C45 supplied by Rohm & Haas are considered particularly suitable. The alkyd-acrylic copolymers are preferably selected from the group comprising Amerlac 292X supplied by Rohm & Haas, Lustrasol 13–137 supplied by Reichold and Chempol 13–1410 supplied by Freeman.

Modified formaldehyde resins may comprise urea-formaldehyde such as F–240, melamine formaldehyde such as MM55 and triazine formaldehyde such as MX61, all supplied by Rohm & Haas.

Suitable epoxy resins comprise Epi-Rez 510 supplied by Jones-Dabney, Araldite 6005 supplied by Ciba or Epon 828 supplied by Shell Chemical.

A wide variety of stabilizers are available including Drapex 6.8 (epoxidized soybean oil), Mark 275, 180, 445 and 446 (benzophenon type light stabilizer) supplied by Argus Chemical Corporation, Paraplex G60 and G62 supplied by Rohm & Haas, Flomax 25, CS–137, Provinite and Clarite A and B supplied by National Lead.

The compositions of the products referred to above by trademark designations are as follows:

2013—A methyl/n-butyl methacrylate copolymer having a typical inherent viscosity of 0.20 as measured in a solution of 0.25 g. polymer in 50 ml. of chloroform measured at 20° C. using a No. 50 Cannon-Fenske Viscometer. All inherent viscosities on these resins are measured in a similar manner. Elvacite 2013 has a specific gravity of 1.16.

2044—An n-butyl methacrylate polymer having a typical inherent viscosity of 0.53. It is considered to be a high molecular weight resin and has a specific gravity of 1.07.

6014—A methyl methacrylate copolymer having a typical inherent viscosity of 0.45 and is considered to be a medium molecular weight resin. This resin is supplied as a solution, 40% supplied in a mixture of 80 parts toluene to 20 parts isopropanol. It has a specific gravity of 1.16 and an acid number of 12 to 15.

6016—A methyl/n-butyl methacrylate copolymer having a typical inherent viscosity of 0.26. This is considered a low molecular weight resin. It is furnished as a 40% solution in toluene. It has a specific gravity of 1.12 and an acid number of 2.5 to 4.0.

All of these Elvacite resins are described in a booklet by du Pont entitled "Properties of Elvacite Acrylic Resins," copyrighted 1966 and numbered A–45610 (5M, 1/66).

Acryloid B–72—Is supplied as a 40% solid resin in toluene, having a specific gravity of 0.96; a viscosity in centipoises at 30° C. of 480–640.

Acryloid B–66—Is supplied as a 40% solid resin in toluene, having a specific gravity of 0.97; a viscosity in centipoises at 30° C. 250–335.

Acryloid B–44—Is supplied as a 40% resin solution in toluene, having a specific gravity of 0.98; a viscosity in centipoises at 30° C. of 600–1100.

The information on the Acryloid resins was obtained from a booklet entitled "Acryloid—Acrylic Ester Resins for Coatings" by Rohm & Haas, copyrighted 1958—Numbered C–46–58 (Revised February 1962).

Duraplex D–76—Is an alkyl resin containing phthalic anhydride and based on coconut oil. Material on a solids basis has an acid number of 4–8. Solution in xylol containing 60% solids has a density of 8.4 lbs./gallon.

Duraplex ND–77B—Is an alkyl resin containing 47% phthalic anhydride on a solids basis and 33% coconut oil. It has an acid number on a solids basis of 4–10. Solution in xylol containing 60% solids—density 8.6 lbs./gallon.

Duraplex ND–78—Is an alkyd resin containing 43% phthalic anhydride and 33% coconut oil, having an acid number based on solids of 6–10. Solution is xylol of 60% solids—density of 8.5 lbs./gallon.

Duraplex C–45 Is furnished in two grades: HV nd LV.

HV—An alkyl resin containing 33% phthalic anhydride on a solids basis and 53% linseed oil, having an acid number of 5–15 on a solids basis. Solution in mineral thinner containing 60% solids, has a density of 7.9 lbs./gallon.

LV—An alkyd resin containing 30% phthalic anhydride on a solids basis and 60% linseed oil, having an acid number of 9–18 on a solids basis and a density of 9.0 lbs./gallon.

This information was obtained from a booklet by Rohm & Haas entitled "Duraplex and Amberlac—Alkyd Type Resins," 1958, No. C–48–58, April 1961 edition.

Amberlac 292X—An alkyd-acrylic resin based on castor oil having an acid number on a solids basis of 13 maximum, as a solution having 48% solids in xylol and having a density of 7.9 lbs./gallon.

The reference is the same booklet as cited for the alkyd resins above.

Lustrasol 13–137—An alkyd modified acrylic resin furnished as a solution of 59 to 61% solids in Solvesso 150 solvent, having an acid number of 7 maximum, and a specific gravity of 1.027 to 1.037.

Chempol 13–1410—An acrylic alkyl copolymer based on safflower oil, containing 14% phthalic anhydride and exhibiting an acid number of 3 to 7. Supplied as a 50% solids solution in xylol. This is sold by the Freeman Chemical Company.

Uformite F–240—A urea formaldehyde resin containing 60% solids, furnished as a xylol-butanol mixture (1:1½) having an acid number on a solids basis of 3 to 8, a specific gravity of 1.02.

Uformite MM–55—A melamine formaldehyde resin containing approximately 50% solids in a xylol-butanol mixture of 1:4, having an acid number on a solids basis of 0 to 2, a specific gravity of 0.97.

Uformite MX–61—A triazine formaldehyde resin containing approximately 60% solids in a xylol-butanol 1:1 mixture. It has an acid number on a solids basis of 0 to 1, a specific gravity of 1.04.

The information on these modified formaldehyde resins was obtained from a booklet by Rohm & Haas entitled "Uformite—Urea, Melamine and Other Triazine Formaldehyde Resins for Finishes," No. C–50–58, December 1958, Revised November 1964.

Epi-Rez 510—A bis phenol A based epoxy resin having a weight epoxy of 180 to 200, a specific gravity of 1.16, a viscosity of 10,000 to 16,000 centipoises at 25° C.

This information was obtained from a technical booklet by Johnes-Dabney Co., dated May 1, 1962.

Araldite 6005—A low viscosity, liquid epoxy resin, having a viscosity in centipoises at 25° C. of 7000 to 10,000, an epoxy value equivalence per 100 g. of 0.53 to 0.55, weight per gallon of 9.6 to 9.8.

This information was found in a Ciba technical bulletin on epoxy resins, No. 20820/7.

Epon 828—A light colored, epichlorohydrin/bisphenol A-type, low molecular weight epoxy resin, having a viscosity at 25° C. of 100 to 160 poises and an epoxy equivalent of 185 to 192. It has a density of 1.168 at 20° C., a refractive index at 25° C. of 1.570 to 1.575 and an average molecular weight of approximately 380. This material is made by the Shell Chemical Company and is described in a Shell Chemical Company Data Sheet SC:60–146R, July 1962.

Drapex 6.8—Is epoxidized soybean oil, having a specific gravity of 0.990, a refractive index of 1.469, a freezing point of 0° C., an acid number of 0.9 and a percentage of oxirane oxygen of 6.6.

This information was obtained from an Argus Technical Bulletin, No. 3, on Drapex Plasticizer, dated September 1961.

Mark 27—An organotin stabilizer having a specific gravity at 25° C. of 1.145, a refractive index at 25° C. of 1.484.

This information was obtained from an undesignated mimeographed sheet furnished by Argus Chemical Company.

Mark 445—A liquid, organotin mercaptide stabilizer having a specific gravity at 25° C. of 1.1410 and a refractive index at 25° C. of 1.4923.

Mark 446—A solid, ultraviolet absorber having a melting point of 56 to 58° C.

Mark 445 and 446 were similarly both identified in an undesignated mimeographed sheet furnished by Argus.

Flomax 25—A liquid barium-cadmium organic complex having a specific gravity at 25° C. of 1.03, a refractive index at 25° C. of 1.48.

Information found in a "Dutch Boy" Flomax 25 Bulletin by National Lead Company.

Mark 180—A liquid barium-cadmium stabilizer having a specific gravity at 25° C. of 1.022 and a refractive index at 25° of 1.490.

CS–137—A barium-sodium organic complex having a specific gravity of 1:54 and a refractive index of 1.48. Supplied as a 70% solids content paste in dioctyl phthalate.

Information from "Dutch Boy" Bulletin CS–137.

Provinite—A barium-cadmium organic complex. Furnished in two forms:

Provinite A—A powder having a specific gravity of 1.31 and a refractive index of 1.53.

Provinite B—A liquid having a specific gravity of 0.992 and a refractive index of 1.513.

Both of these compounds are furnished by National Lead and are identified in a technical bulletin entitled "Dutch Boy" Provinite.

Paraplex G 60—A high molecular weight oil epoxide plasticizer stabilizer—molecular weight 1,000; specific gravity 0.990; lbs./gallon 8.3; viscosity at 25° C., 2.5 poises; refractive index at 25° C. 1.472; acid number 0.3.

Information from book—Plasticizer Perplex and Monoplex Rohn & Haas 1960.

Paraplex G 62—Oil epoxide plasticizer stabilizer—molecular weight 1,000; viscosity 3.5 at 25° C.; refractive index 1.471; acid number 0.4; specific gravity 0.993.

The following comprise specific examples of intercoat compositions falling within the preferred aspects of the instant invention:

Example I

| Ingredients: | Percent by weight |
|---|---|
| Vinyl chloride-acetate copolymer (VAGH) | 12 |
| Cyclohexanone | 70 |
| Methyl isoamylketone | 10 |
| Methyl isobutylketone | 8 |

Example II

| Ingredients: | Percent by weight |
|---|---|
| Vinyl chloride-acetate copolymer (VAGH | 6.6 |
| Methyl-methacrylate/ethyl acrylate copolymer | 8.0 |
| Alkyd-acrylic copolymer (Amberlac 292X) | 3.7 |
| Ethylacetate | 30.0 |
| Methylisobutylketone | 32.4 |
| Cyclohexanone | 1.5 |
| Urea-formaldehyde (F–240) | 1.7 |
| Stabilizer system (Mark 180, Drapex 6.8 and Mark 446) | 0.5 |
| Xylol and toluol | 15.6 |

Where the composition of Example II is employed, vinyl and polyester materials can be coated with a film of the composition, and the materials can be immediately passed to a baking device. The baking operation preferably comprises heating of the materials to a temperature above 40° C. but preferably not exceeding 90° C. to drive out volatile traces thereby improving adhesion and resistance to aging. When an operation of this nature is carried out for from 30 seconds to 5 minutes, the intercoat composition will be completely dry to the extent that continuous sheets can be formed into rolls while individual lengths of the material can be stacked on top of each other without danger of sticking of the coating to the back sides of adjacent sheets. The coatings are characterized by ideal adhesion and they have been found to be completely compatible with respect to printing inks of virtually any composition. Accordingly, the compositions of this invention achieve the results accomplished in the aforementioned copending applications while also providing improved production efficiency.

It will also be appreciated that the coatings can be air dried as indicated in Ser. No. 395,331. The removal of the solvent is, however, substantially slower where air drying is concerned and, therefore, air drying is not nearly as efficient from the standpoint of commercial operations.

As previously noted, the intercoat compositions are also characterized by a desirable degree of plasticity whereby handling ease can be realized. High chemical resistance is achieved particularly due to the presence of the formaldehyde resins or epoxy resins and alkyd-acrylic-copolymers. These alkyd-acrylic-copolymers are also effective to increase the stability of the intercoat composition. An additional advantage of the instant invention resides in the fact that aromatic hydrocarbons can be employed as diluents, and since such materials are relatively cheap, the compositions of the invention are not unduly expensive.

With particular reference to vinyl films, it is to be noted that such films can be readily given the appearance of a colored film thereby overcoming difficulties encountered in this respect when employing prior art techniques. In one suitable procedure for providing such films, coatings comprising alkyd or nitrocellulose based vehicles and including suitable pigments can be readily applied over vinyl surfaces having the described intercoat composition applied thereto. Naturally, this arrangement can also be employed with other surfaces including polyester.

It is also important to note that coatings of the type described herein can have pigments or dyes added directly thereto whereby the application of the intercoat will impart a colored appearance to a vinyl or polyester surface. Finally, standard printing methods could be employed for any ink of any color on the intercoat surfaces.

Where an intercoat of this invention is first applied to a vinyl or polyester substrate, printing inks and lacquers can be readily applied and provide extremely satisfactory quality. Compositions applied include printing inks and coatings based on acrylic, and methacrylic ester resins, alkyd resins, nitrocellulose, vinyl butyral resin, urea-formaldehyde resins, melamine resins, oleoresinous vehicles, shellac and varnishes.

Where reference is made in the foregoing specification and in the appended claims to copolymers of vinyl chloride and vinyl acetate, it will be appreciate that the so-called "modified" copolymers are included within the scope of the invention. Examples of such modified materials, which may comprise VAGH, VAGD, VMCH and VMCC, are found in Lox et al. Patent No. 3,137,666.

That which is claimed is:

1. In a method for applying materials consisting of inks and coatings selected from the group consisting of alkyd and nitro-cellulose based materials onto surfaces of the group consisting of vinyl and polyester surfaces, the improvement comprising forming a film over one of said surfaces, said film consisting essentially of from 10 to 20 percent by weight vinyl chloride-acetate copolymer, from 7.5 to 20 percent by weight of at least one member selected from the group consisting of acrylic polymers containing 1 to 4 carbon atoms and alkyd acrylic-copolymers, and the balance a solvent selected from the group consisting of saturated and unsaturated ketones, nitro compounds, aromatic hydrocarbons, esters, chlorinated hydrocarbons and combinations thereof, thereafter drying said film to remove substantially all of said solvent, and applying one of said materials over said film.

2. A method in accordance with claim 1 wherein said surfaces are of the group consisting of polyvinyl chloride and polyvinyl acetate.

3. A method in accordance with claim 1 wherein said film is force dried by the application of heat.

4. A method in accordance with claim 1 wherein said film is air dried.

5. A method in accordance with claim 1 wherein said film contains up to about 1 percent by weight polyvinyl chloride.

6. A method in accordance with claim 1 wherein said film includes from 0.0 to 5.0 percent by weight of a member selected from the group consisting of modified formaldehyde resins and epoxy resins, from 0 to 1.0 percent by weight stabilizers, and from 0 to 25.0 percent by weight aromatic hydrocarbons.

7. A method in accordance with claim 1 wherein said film includes a material selected from the group consisting of pigments and dyes whereby said film provides a colored surface on said vinyl and polyester.

8. A method in accordance with claim 1 wherein said solvent includes at least one of the members selected from the group consisting of isophorone and cyclohexanone comprising from one to five percent by weight of the film.

9. A method in accordance with claim 8 wherein the balance of said solvent consists of at least one member selected from the group consisting of methylethylketone, methylisobutylketone and ethylacetate, said group comprising from 45 to 75 percent by weight of said film.

10. An article of manufacture formed from a material selected from the group consisting of vinyl and polyester materials, said material comprising the base portion of said article, an intercoat composition applied over said base portion, said intercoat composition consisting essentially of vinyl chloride-acetate copolymer and at least one member selected from the group consisting of acrylic polymers containing 1-4 carbon atoms and alkyd-acrylic copolymers, and an outer coating in the form of printed material applied over at least a portion of the surface of said intercoat composition, said outer coating comprising a composition selected from the group consisting of alkyd and nitro cellulose based materials, said acrylic and alkyd-acrylic being present in said intercoat composition in a ratio between a maximum of about 7 parts and a minimum of about 0.6 parts to one part of the vinyl chloride-acetate copolymer.

11. An article in accordance with claim 10 wherein said intercoat contains up to 5 percent by weight polyvinyl chloride.

12. An article in accordance with claim 10 wherein said intercoat includes a material selected from the group consisting of pigments and dyes whereby said intercoat comprises a colored background for said outer coating.

References Cited

UNITED STATES PATENTS

| | | | |
|---|---|---|---|
| 2,427,513 | 9/1947 | Spessard | 260—132.8 X |
| 2,770,566 | 11/1956 | Ritter | 117—73 X |
| 2,872,423 | 2/1959 | Goldstein | 117—138.8 X |
| 3,136,657 | 6/1964 | Dixler et al | 117—138.8 |
| 3,231,393 | 1/1966 | Downing | 117—161 X |
| 3,305,602 | 2/1967 | Bromstead | 260—32.8 X |
| 3,323,943 | 6/1967 | Bromstead | 117—161 X |

ALFRED L. LEAVITT, Primary Examiner

A. GRIMALDI, Assistant Examiner

U.S. Cl. X.R.

117—45, 72, 138.8, 161; 260—32.8, 33.8